July 31, 1951 — E. J. STRANDBERG — 2,562,832
PLANER ATTACHMENT FOR PORTABLE POWER SOURCES
Filed April 30, 1948 — 2 Sheets-Sheet 1
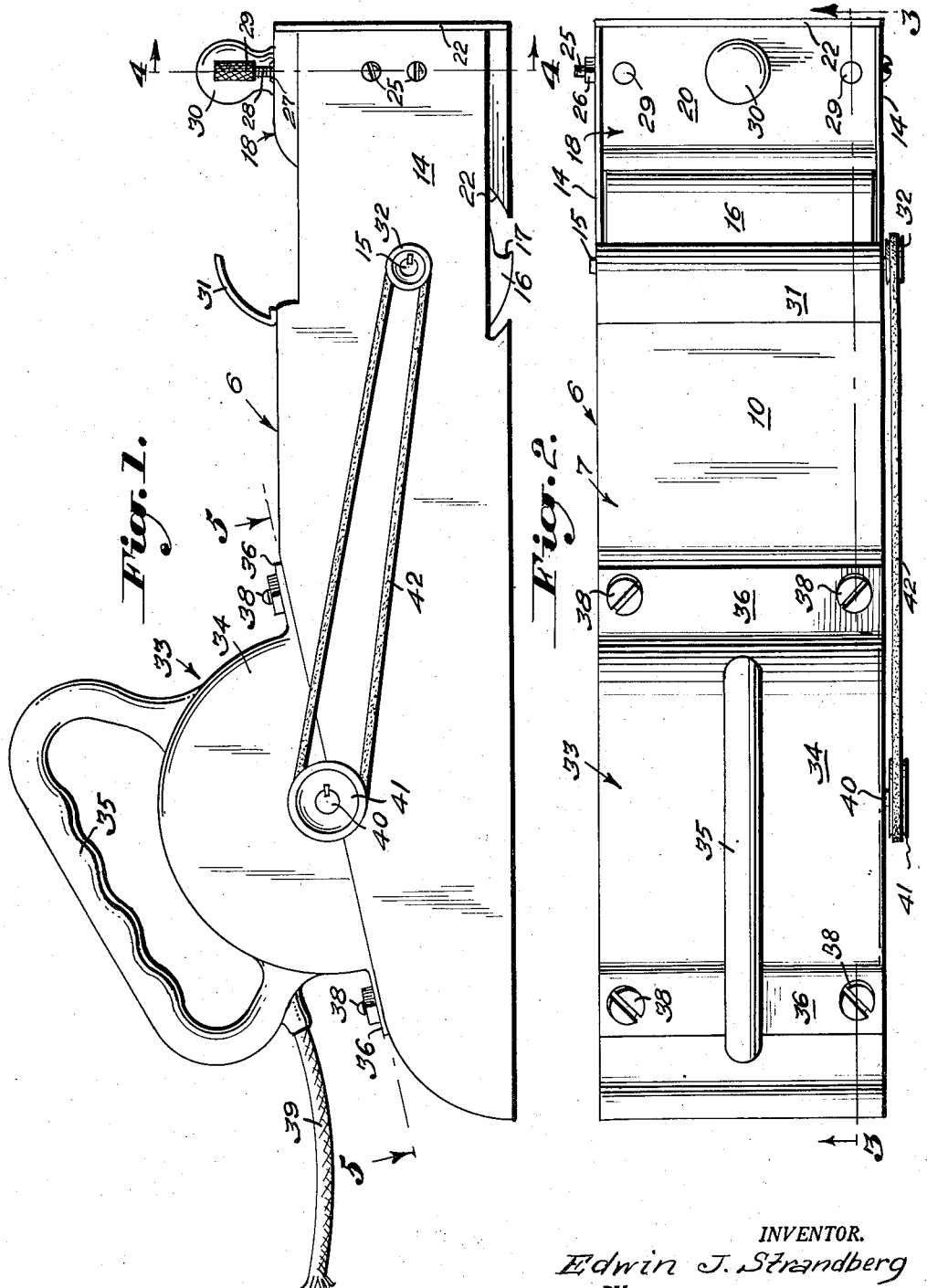
INVENTOR.
Edwin J. Strandberg

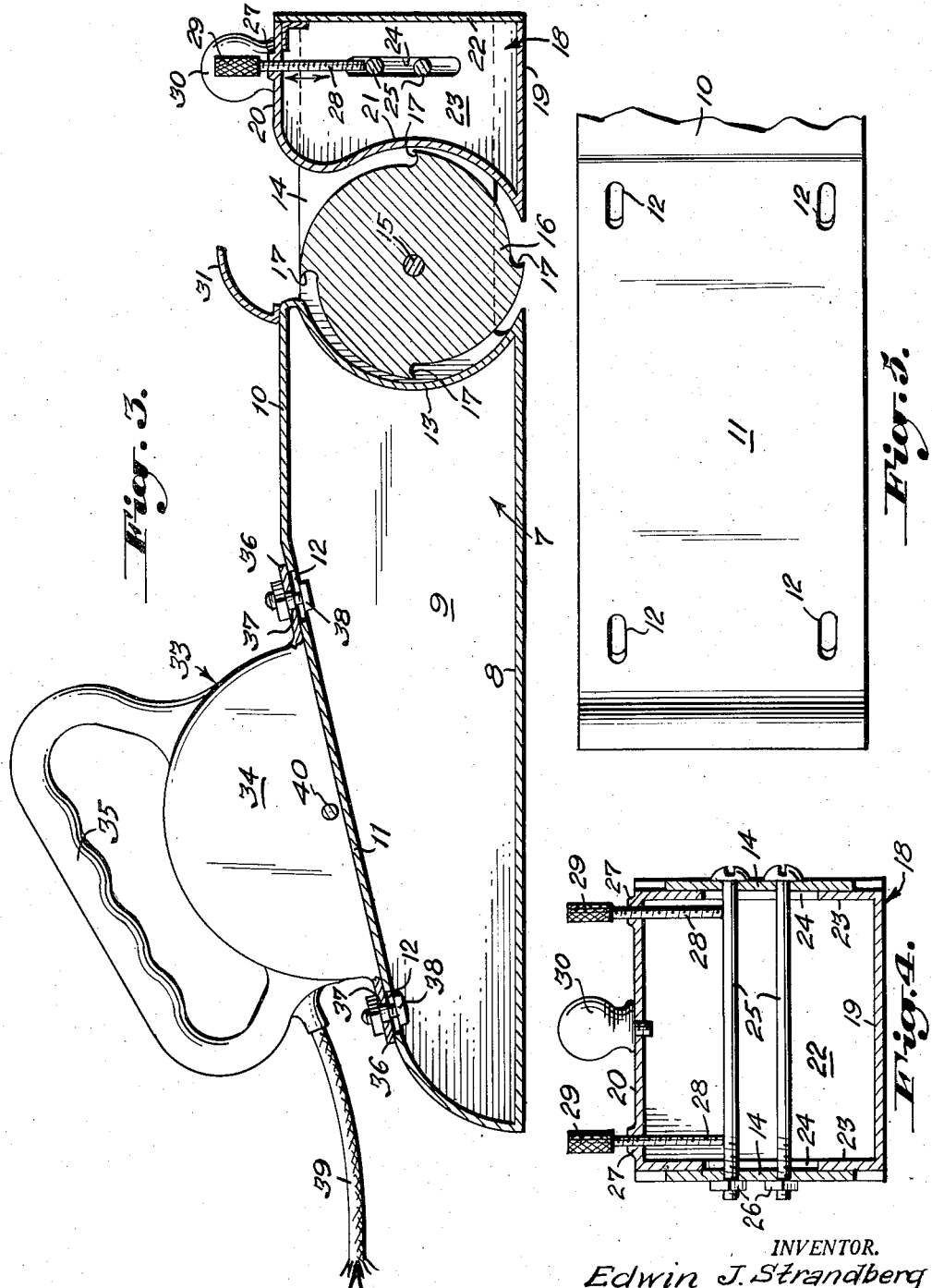

Patented July 31, 1951

2,562,832

UNITED STATES PATENT OFFICE 2,562,832

PLANER ATTACHMENT FOR PORTABLE POWER SOURCES

Edwin J. Strandberg, Deadwood, S. Dak.

Application April 30, 1948, Serial No. 24,305

1 Claim. (Cl. 145—5)

This invention relates to a novel planer attachment of extremely simple construction and which is constructed and arranged for the ready mounting thereon of a conventional portable power source for utilizing the power source for driving the planer attachment to thereby provide a simple and economical attachment for a portable power source whereby it may be utilized with the attachment as a power planer.

More particularly, it is an object of the present invention to provide a planer attachment of extremely simple construction on which a portable power source can be adjustably mounted for driving a rotary planer from the driven shaft of the power source.

Still a further object of the invention is to provide an attachment having a shoe disposed in advance of the planer rotor and which is adjustable for varying the planing depth of the rotor.

Still a further object of the invention is to provide an attachment of extremely simple yet durable construction which is capable of being economically manufactured and sold and which will afford an attachment for substantially all types of conventional hand supported portable power sources.

Various other objects and advantages of the invention will hereinafter become more fully apparent from the following description of the drawings, illustrating a presently preferred embodiment thereof, and wherein:

Figure 1 is a side elevational view showing the attachment in an operative position and with a portable power source mounted thereon;

Figure 2 is a top plan view thereof;

Figure 3 is a longitudinal sectional view taken substantially along a plane as indicated by the line 3—3 of Figure 2;

Figure 4 is a cross sectional view taken substantially along a plane as indicated by the line 4—4 of Figure 1, and Figure 5 is a longitudinal sectional view taken substantially along a plane as indicated by the line 5—5 of Figure 1.

Referring more specifically to the drawings, the planer attachment for a portable power source comprising the invention is designated generally 6 and includes a hollow metal body portion 7 composed of a substantially flat bottom 8, upright side walls 9 and a top 10 which slopes toward the rear end of the body 7 and which merges with the bottom 8 at said rear end. The top 10 includes a downwardly and rearwardly inclined rear portion 11 which is provided adjacent each of the corners thereof with an elongated, longitudinally disposed slot 12, for a purpose which will hereinafter become apparent. The body 7 also includes an inwardly or rearwardly bowed forward end wall 13, forming an integral part thereof, and the sides 9 are provided with forward extensions 14 which extend forwardly to substantially beyond the front wall 13 and through which extends a shaft 15 which is journaled in corresponding portions of the extensions 14 and disposed axially with respect to the front wall 13.

A rotor 16 is fixed to the shaft 15 and disposed between the extensions 14 and has its periphery disposed substantially concentric to and spaced from the front wall 13. The periphery of the rotor 16 is recessed from end to end thereof to provide a plurality of circumferentially spaced cutting edges 17 forming integral planer blades of said rotor 16 and each of which extends from end to end of the rotor and all of which face in the same direction, as clearly illustrated in Figure 3.

A hollow metal shoe, designated generally 18 is disposed forwardly of the rotor 16 and supported between the forward ends of the extensions 14. Said shoe 18 includes a substantially flat bottom 19, a top portion 20 having a substantially flat forward part and a downwardly curved rear portion which merges with an arcuate, forwardly bowed rear wall 21 of the shoe 18 and which is bowed in the opposite direction to the wall 13 and disposed in opposed relationship thereto. The rear wall 21 is likewise disposed substantially concentrically of the shaft 15 and rotor 16. The shoe 18 also includes an upright front wall 22 the side edges of which overlie the upright side walls 23 of the shoe 18 to form guides for engaging the forward ends of the extensions 14. The side walls 23 are provided with aligned upright, elongated openings 24 to accommodate the shanks of two elongated headed bolts 25 which extend therethrough and through aligned openings in the extensions 14 and which are provided with clamping nuts 26 on their threaded ends which bear against the outer side of one of the extensions 14 while the heads of said bolts bear against the outer side of the other extension 14, so that by tightening the nuts 26 the shoe 18 can be detachably clamped between the extensions 14 and thereby positioned relatively to the body 7. The top wall 20 adjacent each side edge thereof is provided with a threaded boss 27 through which extends an adjusting screw 28 having a knurled head 29 on its upper end disposed above the top wall 20. The lower ends of the adjusting screws 28 bear on the upper bolt 25 for limiting the downward displacement of the shoe 18 with respect to the extensions 14 and accordingly the level of the bottom 19 relatively to the level of the bottom 8, so that by adjusting the setscrews 28 and loosening the nuts 26 the shoe bottom 19 can be disposed at any desired level with respect to the level of the bottom 8 for varying the cutting depth of the planer blades or cutting edges 17, and so that the shoe 18 can be clamped in adjusted position by tightening the nuts 26 and will be prevented by the setscrews 28 from dropping below its adjusted position. A knob 30 which is threadedly secured to the top wall 20 rises therefrom to provide a handgrip for one hand of the operator.

The top wall 10 at its forward end is provided with an upwardly and forwardly extending curved shield 31 which is disposed over the rear part of the open top of the space in which the rotor 16 is mounted to prevent shavings and other particles from flying upwardly and rearwardly from the rotor 16 and toward the operator. As best seen in Figure 1, one of the ends of the shaft 15 which protrudes outwardly from one of the extensions 14 has a V belt pulley 32 keyed thereto.

A conventional portable power source, designated generally 33, such as an electric motor of a power hand saw from which the circular saw blade and saw guide has been removed, is adapted to be mounted on the upper side of the inclined top portion 11. The frame 34 of the power source 33 is provided with a handle 35 which rises from the upper part thereof and the open bottom of said frame 34 at its front and rear ends is provided with extensions 36 having openings 37 therein which register with the slots 12 and which are adapted to receive clamping screw fastenings 38 which extend through said slots and through the openings for detachably and adjustably clamping the frame 34 to the planer body 7. The frame 34 contains an electric motor, not shown, which is adapted to be connected to a source of electric current by electrical wiring 39 extending therefrom and which electrical power motor is connected in a conventional manner, not shown, to a driven shaft 40 which extends transversely through the frame 34 and which is journaled therein and to which a circular saw blade is normally fixed. A V belt pulley 41 is keyed to one end of the shaft 40 in longitudinal alignment with the pulley 32 and an endless V belt 42 is trained over said pulleys so that when the shaft 40 is driven by the power source 33 in a counter-clockwise direction, as seen in Figure 1, the shaft 15 and rotor 16 will likewise be driven in the same direction by the pulley and belt connection. It will be readily apparent that the slots 12 permit longitudinal adjustment of the frame 34 relatively to the body 7 for obtaining the proper tension of the belt 42.

From the foregoing it will be readily apparent that the planer attachment 6 provides an extremely simple yet durable device adapted for mounting a conventional portable power source of a hand saw after removal of the saw blade and guide whereby the planer rotor may be driven from the power source of the hand saw. The handle 35 of the frame 34 is utilized as one of the handgrips of the attachment 6 and may be grasped with either hand by the user with the other hand engaging the knob 30 for manually supporting and controlling the planer 6 while in operation.

Various modifications and changes are contemplated and may obviously be resorted to, without departing from the spirit or scope of the invention as hereinafter defined by the appended claim.

I claim as my invention:

In combination with a portable power source, a planer body, means demountably supporting the portable power source on the planer body near one end thereof, side extensions extending from the sides of the planer body beyond its opposite end, a shaft journaled in said side extensions, a planer rotor fixed to the shaft and rotatably disposed between the side extensions, power take-off means connecting the shaft to the portable power source, a shoe disposed between the side extensions beyond the planer rotor and having side walls provided with aligned vertical slots, headed bolts having shanks extending through said side extensions and loosely through the vertical slots, nuts engaging the shank ends of the bolts and clamping the shoe at different levels relatively to the planer body, said shoe having a top wall provided with a threaded boss adjacent each end thereof, and a screw extending downwardly through each of said threaded bosses, said screws bearing on the shank of the uppermost bolt and adjustably limiting the downward displacement of the shoe.

EDWIN J. STRANDBERG.

REFERENCES CITED

The following references are of record in the file of this patent:

UNITED STATES PATENTS

| Number | Name | Date |
| --- | --- | --- |
| 86,295 | Foster | Jan. 26, 1869 |
| 820,751 | Wattles | May 15, 1906 |
| 1,418,328 | Power | June 6, 1922 |
| 1,426,739 | Hoy et al. | Aug. 22, 1922 |
| 1,530,028 | Billingsley | Mar. 17, 1925 |
| 1,559,797 | Slomer | Nov. 3, 1925 |
| 1,679,562 | Clarke | Aug. 7, 1928 |
| 2,395,268 | Goodridge | Feb. 19, 1946 |